(12) United States Patent
Lang et al.

(10) Patent No.: US 9,012,029 B2
(45) Date of Patent: Apr. 21, 2015

(54) METHOD OF BONDING PANELS OF DISSIMILAR MATERIAL AND BONDED STRUCTURE

(75) Inventors: Steven C. Lang, Columbus, MI (US); Joseph M. Polewarczyk, Rochester Hills, MI (US); Peter M. Parlow, Columbus, MI (US)

(73) Assignee: GM Global Technology Operations LLC, Detroit, MI (US)

(*) Notice: Subject to any disclaimer, the term of this patent is extended or adjusted under 35 U.S.C. 154(b) by 297 days.

(21) Appl. No.: 13/473,880

(22) Filed: May 17, 2012

(65) Prior Publication Data
US 2013/0309520 A1    Nov. 21, 2013

(51) Int. Cl.
| | |
|---|---|
| B32B 3/08 | (2006.01) |
| B32B 15/18 | (2006.01) |
| B62D 27/02 | (2006.01) |
| B23K 11/00 | (2006.01) |
| B23P 17/00 | (2006.01) |
| B32B 3/06 | (2006.01) |
| B32B 15/01 | (2006.01) |
| B23K 11/16 | (2006.01) |
| B23K 20/12 | (2006.01) |
| F16B 5/10 | (2006.01) |

(52) U.S. Cl.
CPC ... *B32B 3/08* (2013.01); *B32B 3/06* (2013.01); *B32B 15/01* (2013.01); *B32B 15/18* (2013.01); *B23K 11/16* (2013.01); *B23K 20/1295* (2013.01); *B23K 11/0066* (2013.01); *F16B 5/10* (2013.01); *B62D 27/02* (2013.01)
USPC ............. 428/594; 428/598; 428/653; 219/93; 219/94; 219/98; 29/897.32; 29/897.2

(58) Field of Classification Search
None
See application file for complete search history.

(56) References Cited

U.S. PATENT DOCUMENTS

| | | | | | |
|---|---|---|---|---|---|
| 1,132,989 | A | * | 3/1915 | Walker | 219/92 |
| 1,294,679 | A | * | 2/1919 | Lachman | 219/94 |
| 1,296,651 | A | * | 3/1919 | Gravel | 219/94 |
| 1,330,241 | A | * | 2/1920 | Cutter | 219/94 |
| 1,630,668 | A | * | 5/1927 | Mossberg | 219/94 |
| 1,890,093 | A | * | 12/1932 | Neff | 27/5 |
| 2,040,102 | A | * | 5/1936 | Peron | 126/390.1 |
| 2,108,409 | A | * | 2/1938 | Peron | 228/162 |
| 2,327,924 | A | * | 8/1943 | Mounts | 411/501 |
| 2,563,107 | A | * | 8/1951 | Fanger | 219/94 |

(Continued)

FOREIGN PATENT DOCUMENTS

| | | |
|---|---|---|
| DE | 1099663 B | 2/1961 |
| DE | 4237361 A1 | 5/1994 |

(Continued)

*Primary Examiner* — John J Zimmerman
(74) *Attorney, Agent, or Firm* — Quinn Law Group, PLLC

(57) ABSTRACT

A method of bonding a first panel made of a first material to a second panel made of a second material is provided. The method includes creating a second panel hole in the second panel at a weld location. An insert composed of the first material is inserted into the second panel hole in the second panel. At least a portion of the insert is fittable in the second panel hole and sized to correspond to the second panel hole. The first panel and the insert are welded together at the weld location, thereby bonding the first and second panels. In one embodiment, the first and second panels are placed between the first and second electrodes of a welding gun. A force is applied to clamp the insert and the first panel between the first and second electrodes and a welding current is delivered. A bonded structure is provided.

16 Claims, 2 Drawing Sheets

(56) References Cited

U.S. PATENT DOCUMENTS

| | | | |
|---|---|---|---|
| 2,860,230 A * | 11/1958 | Rapasky | 219/94 |
| 3,095,951 A * | 7/1963 | Rood et al. | 403/272 |
| 3,488,466 A * | 1/1970 | Poupitch | 219/99 |
| 3,702,024 A * | 11/1972 | Baker, Jr. | 29/525.12 |
| 3,774,009 A * | 11/1973 | Hodges | 219/98 |
| 3,942,239 A * | 3/1976 | Johansson | 29/462 |
| 4,119,827 A * | 10/1978 | Lenox | 219/98 |
| 4,276,969 A * | 7/1981 | Chin et al. | 188/218 XL |
| 5,528,812 A * | 6/1996 | Muller | 29/432.2 |
| 7,030,333 B2 * | 4/2006 | Bradley | 219/99 |
| 8,595,914 B2 * | 12/2013 | Koppitz et al. | 29/525.13 |
| 2009/0294411 A1 | 12/2009 | Khakhalev | |
| 2011/0097142 A1 * | 4/2011 | Bassler et al. | 403/337 |

FOREIGN PATENT DOCUMENTS

| | | |
|---|---|---|
| DE | 102007040014 A1 | 3/2009 |
| WO | 2009123942 A1 | 10/2009 |

\* cited by examiner

METHOD OF BONDING PANELS OF DISSIMILAR MATERIAL AND BONDED STRUCTURE

TECHNICAL FIELD

The present invention relates to a method for bonding panels of dissimilar materials and an assembly including the bonded panels.

BACKGROUND

Welding is a manufacturing or fabrication process that bonds materials such as metals or thermoplastics by causing coalescence, a process by which two separate units grow together, fuse, or merge into a single body. The materials are joined by liquefying or plasticizing (e.g., soften without liquefying) the areas to be bonded together, generally through the application of heat and/or pressure over time, promoting coalescence of the liquefied or plasticized material, and allowing the coalesced material to cool, thereby solidifying the bond. Welding can be used, for example, to join two or more work pieces or for operating on a single work piece, for example, to repair a crack or join a member.

Spot welding using electrical resistance is generally used to join together similar metallic panels with each other. However, when applied to join dissimilar metallic panels, a brittle intermetallic compound is produced at the joint. Accordingly, the spot welding of dissimilar materials has been traditionally achieved with mechanical fasteners, such as bolts and rivets.

SUMMARY

A method of bonding a first panel made of a first material to a second panel made of a second material is provided. A hole (referred to herein as the second panel hole) is created in the second panel at one specific or multiple weld locations. An insert composed of the first material is inserted into the second panel hole in the second panel. At least a portion of the insert is fittable in the second panel hole and sized to correspond to the second panel hole. Any suitable type, size of insert or method of placing or joining the insert in the second panel hole may be employed. The first panel and the insert are welded together at the weld location, thereby bonding the first and second panels together. The insert may be secured in the second panel hole and then welded to the first panel. Alternatively, the insert may be attached to the first panel (both of which are composed of the first material) and then inserted into the second panel hole.

In one embodiment, the first and second panels are placed between the first and second electrodes of a welding gun. A force is applied to clamp the sub assemblies together just prior to spot welding. The first panel and insert, between the first and second electrodes, receives a welding current to complete the weld. In one embodiment, the first panel and the insert are composed of aluminum and the second panel is composed of steel. In another embodiment, the first panel and the insert are composed of a metal and the second panel is composed of a non-metal. First and second embodiments of a bonded structure produced in accordance with the above method are provided.

The above features and advantages and other features and advantages of the present invention are readily apparent from the following detailed description of the best modes for carrying out the invention when taken in connection with the accompanying drawings.

DESCRIPTION

Figure 1:
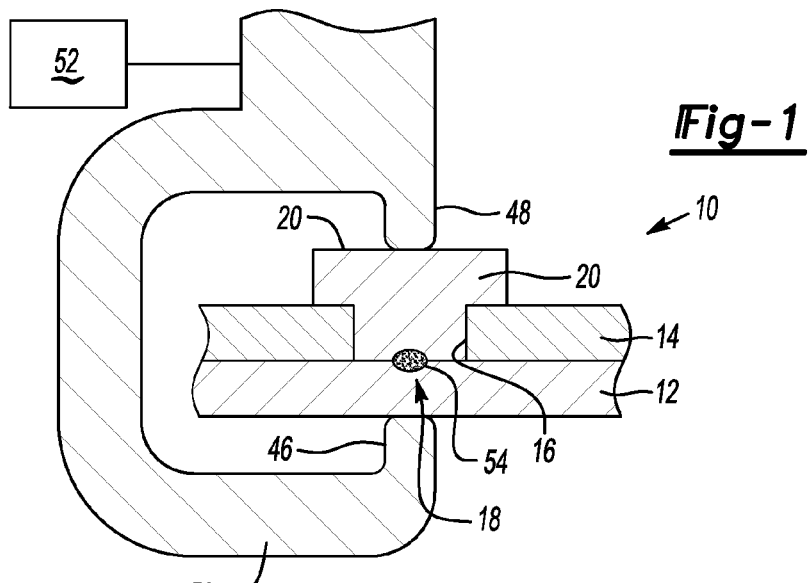
FIG. 1 is a schematic sectional view of a first embodiment of a bonded structure, the bonded structure including first and second panels of dissimilar materials which are bonded using a method as set forth herein.
Figure 2:
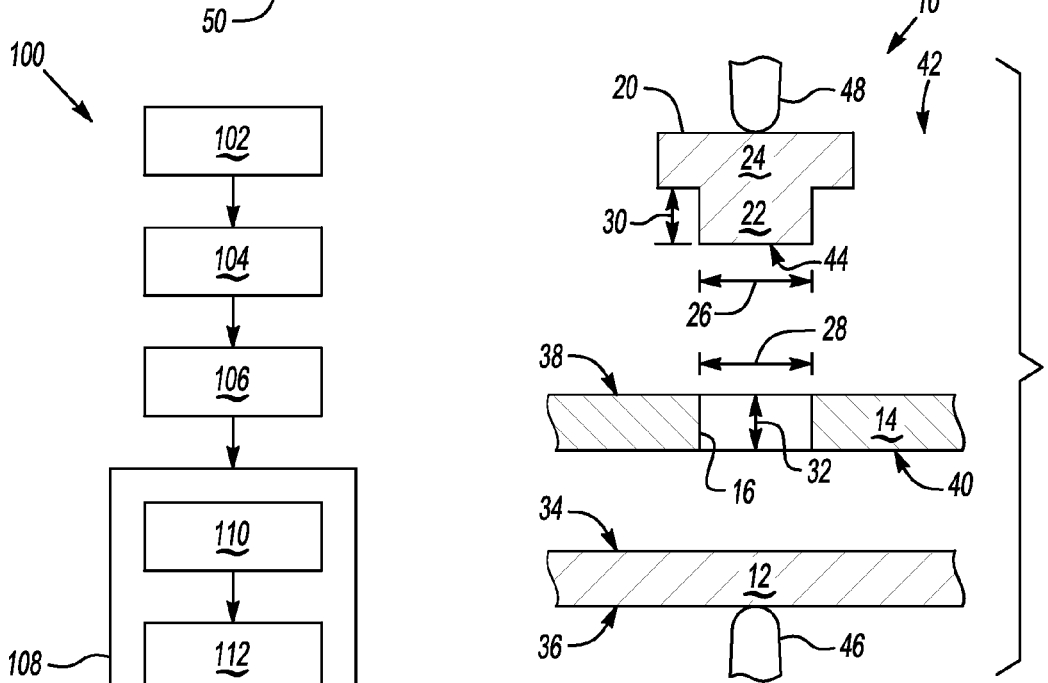
FIG. 2 is a schematic exploded view of the structure shown in FIG. 1.

Referring to the figures, wherein like reference numbers refer to like components throughout the several views, FIG. 1 is a sectional view of a bonded structure 10. FIG. 2 is a schematic exploded view of the bonded structure 10. Referring to FIGS. 1-2, the bonded structure 10 includes a first sheet or panel 12 composed of a first material and a second panel 14 composed of a second material that is operatively connected to the first panel 12. Referring to FIG. 1, the second panel 14 includes a second panel hole 16 at a weld location 18. Referring to FIGS. 1-2, an insert 20 is at least partially positioned in the second panel hole 16 in the second panel 14. The insert 20 is composed of the same first material as is the first panel 12. The insert 20 may have any size or shape. As described below, the first panel 12 and the insert 20 are welded at the weld location 18 so as to bond the first and second panels 12, 14.

Figure 3:
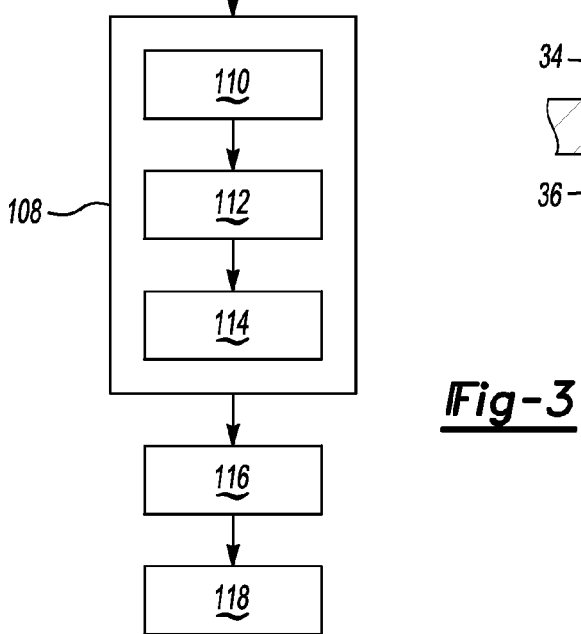
FIG. 3 is a schematic flow diagram of a method for bonding the panels shown in FIG. 1, in accordance with the present disclosure.

With reference now to the flow chart in FIG. 3, a method 100 of bonding a first panel 12 made of a first material to a second panel 14 made of a second material is shown in accordance with the present disclosure. The method 100 need not be applied in the specific order recited herein. Furthermore, it is to be understood that some steps may be eliminated. Referring to FIGS. 1-3, the method 100 begins with step 102, where a second panel hole 16 is created in the second panel 14 around a weld location 18. This may be accomplished with a cutting tool or any other method known to those skilled in the art.

Referring to FIGS. 1-3, in step 104, an insert 20 composed of the first material (as is the first panel 12) is inserted into the second panel hole 16 in the second panel 14. The second panel 14 may include multiple second panel holes 16, with each being filled by an individual matching insert 20. At least a portion of the insert 20 is configured to be fittable in or correspond with the second panel hole 16. By way of a non-limiting example, the insert 20 may include a first portion 22 and a second portion 24. In this example, the first portion 22 is sized to correspond with the second panel hole 16. The width 26 and height 30 of the first portion 22 of the insert 20 are configured to match the width 28 and height 32 of the second panel hole 16. The second portion 24 may be configured to be wider than the first portion 22 so as to retain the insert 20 in the second panel hole 16, in other words, prevent the insert 20 from falling through the second panel hole 16.

Referring to FIGS. 1-2, in step 106, the insert 20 may be secured or retained in the second panel hole 16. The size or geometry of the insert 20 or method of attachment to the second panel hole 16 is not limited to the following description. The insert 20 may be secured or retained by incorporating a structural retaining feature in the insert 20. For example, the structural retaining feature in the insert 20 may be a second portion 24 that is wider than the first portion 22 (shown in FIG. 2) or a chamfered edge 225 in the insert 220 (shown in FIG. 5 and described below). Alternatively, the insert 20 may be secured or retained with the use of adhesives, shrink-fitting, press-fitting, thermal expansion and cooling, crimping, spin welding, friction welding or any other suitable method. The insert 20 may also be secured or retained with different combinations of ways, for example, by having both a structural retaining feature and being glued or friction welded.

Referring to FIGS. 1 and 3, in step 108, a first panel 12 is placed adjacent to and welded with the insert 20 at the weld location 18, thereby bonding the first and second panels 12, 14. The welding of the first panel 12 and the insert 20 at the weld location 18 may be accomplished by the sub steps 110, 112 and 114.

Referring to FIGS. 1 and 3, in step 110, the first and second panels 12, 14 are placed between first and second electrodes 46, 48 of a welding gun 50 (a portion of which is shown), such that one of the electrodes 48 is in contact with the insert 20 and the other electrode 46 is in contact with the first panel 12. Referring to FIGS. 1 and 3, in step 112, a force is applied to at least one of the first and second electrode 46, 48 that is operative to clamp the insert 20 and first panel 12 between the first and second electrodes 46, 48. The welding gun 50 may be powered and controlled by an energy source 52 which may be electrical, chemical or any other type.

Referring to FIG. 2, the first panel 12 defines opposing first and second surfaces 34, 36. Referring to FIG. 2, the second panel 14 defines opposing first and second surfaces 38, 40 and the insert 20 defines opposing first and second surfaces 42, 44. In the embodiment shown, once the insert 20 is positioned in the second panel hole 16 in the second panel 14, the second surface 44 of the insert 20 abuts the first surface 34 of the first panel 12. Referring to FIG. 2, in the embodiment shown, the first electrode 46 is in contact with the second surface 36 of the first panel 12 and the second electrode 48 is in contact with the first surface 42 of insert 20.

Referring to FIGS. 1 and 3, in step 114, a welding current is delivered between the first and second electrodes 46, 48 with the welding gun 50 powered by the energy source 52. The first and second electrodes 46, 48 may concentrate the welding current into a spot 54 and simultaneously clamp the first panel 12 and insert 20 together. Delivering a sufficiently large welding current through the spot 54 will cause the first panel 12 and insert 20 to melt at the spot 54 and form the weld. The welding current is delivered to the spot 54 in a sufficiently short time in order to permit the welding to occur without excessive heating to the rest of the bonded structure 10. The amount of heat or energy delivered to the spot 54 is determined by the resistance between the first and second electrodes 46, 48 and the amperage and duration of the welding current. The amount of energy is chosen to match the material properties of the insert 20 and the first panel 12, their thicknesses and the types of electrodes used. Alternatively, the first panel 12 and the insert 20 may be welded with another solid-state welding technique known to those skilled in the art. The insert 20 and the first and second panels 12, 14 may be formed with any size, shape or thickness.

Because the insert 20 and the first panel 12 are made of the same material, the first and second electrodes 46, 48 "see" the same material, thereby allowing for an efficient spot weld. Note that neither the first nor second electrode 46, 48 "sees" the second panel 14. Thus the second panel 14 may be a non-conducting material. In one embodiment, the first panel 12 and the insert 20 are composed of a metal and the second panel 14 is composed of a non-metal. For example, the first panel 12 and the insert 20 may be composed of steel and the second panel may be composed of glass. In another embodiment, the first panel 12 and the insert 20 are composed of aluminum and the second panel 14 is composed of steel.

Figure 4:
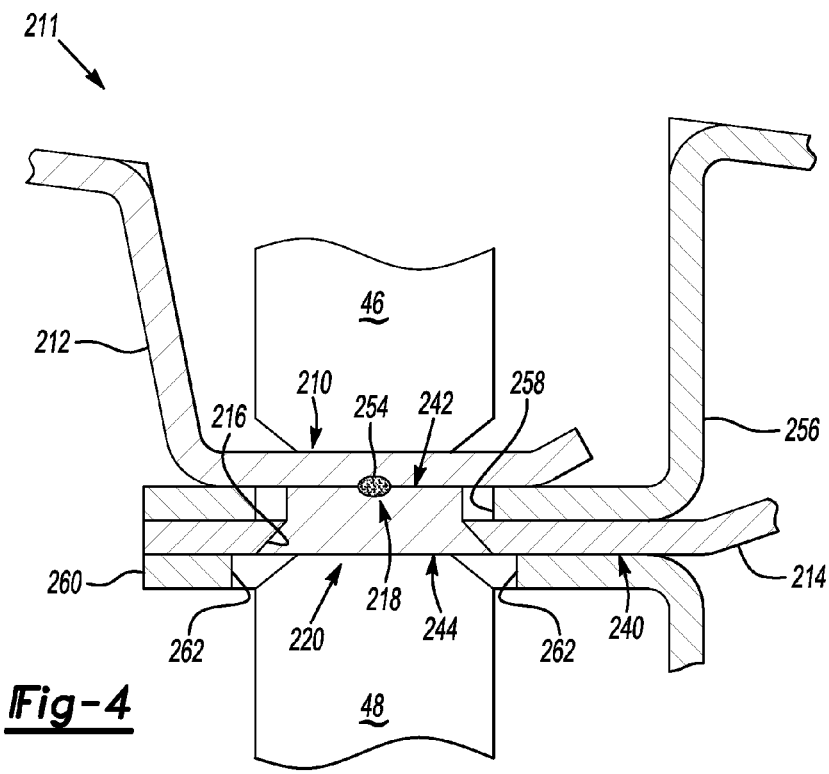
FIG. 4 is a schematic sectional view of a second embodiment of a bonded structure.
Figure 5:
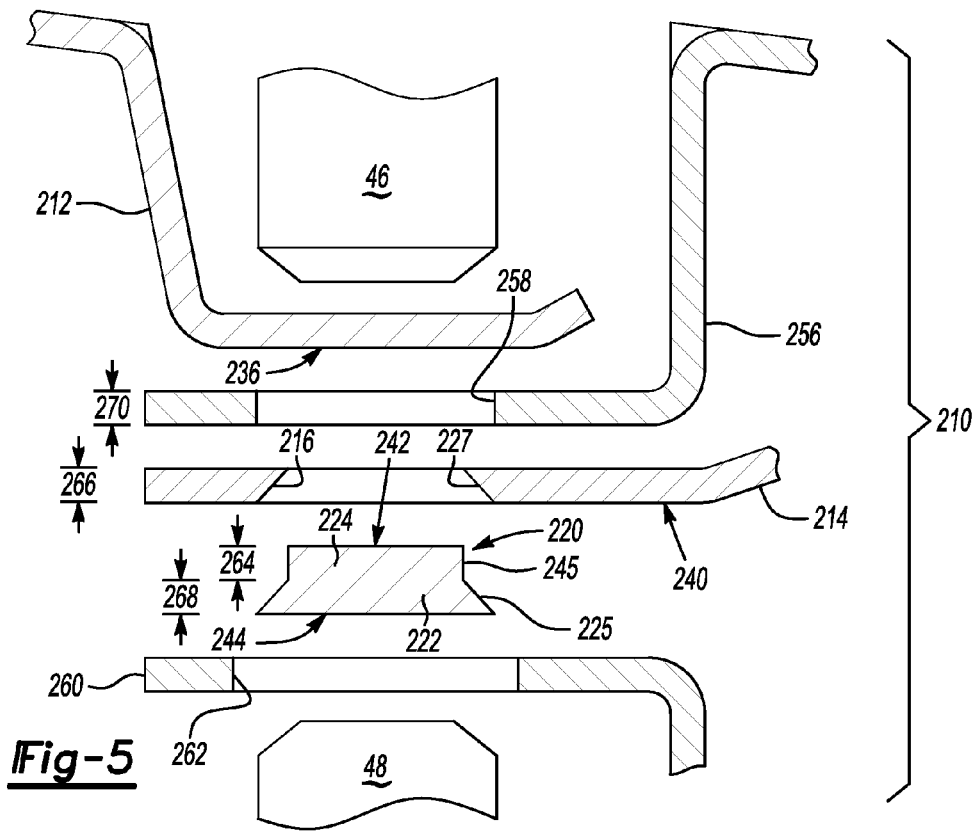
FIG. 5 is a schematic exploded view of the structure shown in FIG. 4.

A second embodiment of a bonded structure 210 is shown in FIGS. 4-5. FIG. 4 is a schematic sectional view of the bonded structure 210. FIG. 5 is a schematic exploded view of the bonded structure 210. For brevity and clarity, like reference numbers are used to refer to like components. The bonded structure 210 may be part of a roof ditch 211 of a vehicle and includes first and second panels 212, 214. The first panel 212 may be a vehicle roof and the second panel 214 may be a vehicle upper body panel. As shown in FIG. 4, the panels 212, 214 may be shaped in any way as long as there is a sufficiently flat region at the welding location 218 in order to perform the welding.

As described above in the method 100 illustrated in FIG. 3 and referring to FIGS. 4-5, a second panel hole 216 is cut or created in the second panel 214. To bond the first panel 212 to the second panel 214, an insert 220 composed of the same material as the first panel 212 is inserted into the second panel hole 216 at a weld location 218. The second panel 214 may include multiple second panel holes 216, with each being filled by an individual insert 220 matching the size and thickness of the second panel hole 216 and welded in a similar manner.

Referring to FIG. 5, the insert 220 may include a first portion 222 and a second portion 224. Referring to FIG. 5, the first portion 222 of the insert 220 may be formed with a chamfered edge 225 that is configured to retain the insert 220 within the second panel 214. The second panel hole 216 in the second panel 214 may be shaped to correspond to the chamfered edge 225 of the insert 220. In other words, the inner profile 227 of the second panel hole 216 may be slanted or angled to correspond to the chamfered edge 225 of the insert 220. The insert 220 also defines a first surface 242 and a second surface 244. Referring to FIG. 5, in the embodiment shown, an outer surface 245 in the second portion 224 may be substantially straight or perpendicular relative to the first surface 242. As noted above, the insert 220 may be formed with any size, shape or configuration.

Referring to FIG. 5, in the embodiment shown, once the insert 220 is positioned in the second panel hole 216 in the second panel 214, the first surface 242 of the insert 220 abuts a second surface 236 of the first panel 212 and is pressed against it by first and second electrodes 46, 48 of a welding gun (such as gun 50 shown in FIG. 1). Referring to FIGS. 4-5, the second surface 244 of the insert 220 may be flush with a second surface 240 of the second panel 214. After each second panel hole 216 has been inserted with an individual matching insert 220, the insert 220 and the first panel 212 are welded at a spot 254 as described above in the method 100 shown in FIG. 3.

Referring to FIGS. 4-5, a third panel 256 may be positioned between the first panel 212 and the second panel 214. The third panel 256 may be a vehicle inner body panel. Referring to FIG. 5, the third panel 256 is formed with a third clearance hole 258 that is substantially coaxially aligned with and larger than the second panel hole 216 such that at least a portion of the insert 220 (the second portion 224 in this case) extends through the third clearance hole 258. Referring to FIGS. 4-5, a fourth panel 260 may be positioned between the second panel 214 and the second electrode 48. The fourth panel 260 may be a reinforcement panel such as a B-pillar panel. Referring to FIGS. 4-5, the fourth panel 260 is formed with a fourth clearance hole 262 that is substantially coaxially aligned with the second panel hole 216, in order to provide access for the second electrode 48 to reach the insert 220. Alternatively, the fourth panel 260 may be positioned between the first panel 212 and the first electrode 46.

Accordingly, referring to FIG. 3, the method 100 may include an additional step 116 in which a third panel 256 is positioned between the first and second panels 212, 214 and a third clearance hole 258 is formed in the third panel 256, where the third clearance hole 258 is substantially coaxially aligned with and larger than the second panel hole 216 such that the insert 220 extends through the third clearance hole 258. The method 100 may include an additional step 118 in which a fourth panel 260 is positioned between second panel 214 and the second electrode 48 and a fourth clearance hole 262 is formed in the fourth panel 260 that is substantially coaxially aligned with the second panel hole 216, in order to provide access for the second electrode 48 to reach the insert 220.

While the method 100 may be applied to the bonded structures 10, 210 illustrated in FIGS. 1-2 and 4-5, respectively, the method 100 may also be applied to other types of structures. Referring to FIG. 5, the thickness 268 of the first portion 222 of the insert 220 may be configured to be the same as the thickness 266 of the second panel 214. Referring to FIG. 5, the thickness 264 of the second portion 224 of the insert 220 may be configured to be the same as the thickness 270 of the third panel 256.

By way of a non-limiting example, the first panel 212 and the insert 220 may be composed of aluminum and the second panel 214 may be composed of steel. As is known to those skilled in the art, steel is available in many grades. Steel is an alloy that consists mostly of iron and generally has a carbon content approximately between 0.2% and 2.1% by weight, depending on the grade. Carbon is the most common alloying material for iron, but various other alloying elements may be used, such as manganese, chromium, vanadium, and tungsten. Varying the amount of alloying elements and the form of their presence in the steel (solute elements, precipitated phase) controls qualities such as the hardness, ductility, and tensile strength of the resulting steel. In one embodiment, referring to FIGS. 1-2 and 4-5, the first panel 12, 212 may be composed of steel of a first grade, the insert 20, 220 may be composed of steel of a second grade and the second panel 14, 214 may be composed of a material that is not steel (e.g., aluminum).

As noted above, the steps in method 100 may be employed in a different order. For example, the insert 20, 220 may be attached to the first panel 12, 212 (both of which are composed of the first material) and then inserted into the second panel hole 16, 216. The insert 20, 220 may be screwed, pierced, punched boss, pre-welded, glued, spot-welded, or friction welded to the first panel 12, 212.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of bonding a first panel made of a first material to a second panel made of a second material, the method comprising:
   creating a second panel hole in the second panel at a weld location;
   inserting an insert composed of the first material into the second panel hole in the second panel, the insert having first and second portions such that the first portion is wider than the second portion;
   wherein the first portion of the insert is configured to extend within the second panel hole;
   wherein respective thicknesses of the second panel and the first portion of the insert are the same;
   positioning a third panel between the first and second panels;
   forming a third clearance hole in the third panel, the third clearance hole being substantially coaxially aligned with the second panel hole;
   wherein the second portion of the insert is configured to extend within the third clearance hole;
   wherein respective thicknesses of the third panel and the second portion of the insert are the same;
   securing the first portion of the insert in the second panel hole, including creating a chamfered edge along a surface of the first portion of the insert and creating an inner wall in the second panel hole configured to correspond with the chamfered edge of the insert; and
   after said securing the first portion of the insert in the second panel hole, welding the first panel and the insert at the weld location, thereby bonding the first and second panels.

2. The method of claim 1, wherein said welding the first panel and insert together at the weld location includes:
   placing the first and second panels between a first and a second electrode, respectively, such that the first electrode is in contact with the first panel and the second electrode is in contact with the insert;
   wherein the first and second electrodes are each in contact with the first material;
   applying a force to at least one of the first and second electrode that is operative to clamp the insert and the first panel between the first and second electrodes; and
   delivering a welding current between the first and second electrodes.

3. The method of claim 2, further comprising, prior to placing the first and second panels between a first and a second electrode, respectively:
   positioning a fourth panel between the second panel and the second electrode;
   forming a fourth clearance hole in the fourth panel such that the fourth clearance hole is substantially coaxially aligned with the second panel hole; and
   wherein the second electrode is configured to extend through the fourth clearance hole.

4. The method of claim 3, wherein the insert does not extend through the fourth clearance hole.

5. The method of claim 1, wherein the first panel and the insert are composed of a metal and the second panel is composed of a non-metal.

6. The method of claim 1, wherein the first panel and the insert are composed of aluminum and the second panel is composed of steel.

7. The method of claim 1, wherein:
   the first panel is composed of steel of a first grade;
   the insert is composed of steel of a second grade; and
   the second panel is not composed of steel.

8. The method of claim 1, further comprising securing the insert in the second panel hole prior to welding by applying an adhesive between the insert and the second panel.

9. A bonded structure of dissimilar materials, the structure comprising:
   a first panel made of a first material;

a second panel made of a second material and operatively connected to the first panel, the second panel including a second panel hole at a weld location;

an insert composed of the first material and having first and second portions such that the first portion is wider than the second portion;

wherein the first portion of the insert is configured to extend within the second panel hole;

wherein respective thicknesses of the second panel and the first portion of the insert are the same;

a third panel positioned between the first and second panels;

wherein the third panel includes a third clearance hole substantially coaxially aligned with than the second panel hole such that the second portion of the insert is configured to extend within the third clearance hole;

wherein respective thicknesses of the third panel and the second portion of the insert are the same;

wherein the first portion of the insert defines a chamfered edge and the second panel hole defines an inner wall configured to correspond to the chamfered edge of the insert; and wherein the first panel and the insert are welded at the weld location so as to bond the first and second panels.

10. The structure of claim 9, wherein the first panel is a vehicle roof and the second panel is a vehicle body panel.

11. The structure of claim 9, wherein the first material is a metal and the second material is not a metal.

12. The structure of claim 9, wherein the first panel and the insert are composed of aluminum and the second panel is composed of steel.

13. The structure of claim 9, wherein:
the first panel is composed of steel of a first grade;
the insert is composed of steel of a second grade; and
the second panel is not composed of steel.

14. The structure of claim 9, wherein:
the insert defines a first surface such that the first portion of the insert is angled relative to the first surface and the second portion of the insert is substantially perpendicular relative to the first surface.

15. The structure of claim 14, further comprising:
a fourth panel positioned adjacent to the second panel and having a fourth clearance hole substantially coaxially aligned with the second panel hole.

16. The structure of claim 15, wherein the insert does not extend through the fourth clearance hole.

* * * * *